US006245865B1

(12) United States Patent
Lee et al.

(10) Patent No.: US 6,245,865 B1
(45) Date of Patent: Jun. 12, 2001

(54) POLYMERIZATION PROCESS FOR PREPARING SYNDIOTACTIC POLYSTYRENES THROUGH MICROFLUIDIZATION

(75) Inventors: Young-Sub Lee; Sang-Sun Woo; Hyun-Joon Kim, all of Taejeon (KR)

(73) Assignee: Samsung General Chemicals Co., Ltd. (KR)

( * ) Notice: Subject to any disclaimer, the term of this patent is extended or adjusted under 35 U.S.C. 154(b) by 0 days.

(21) Appl. No.: 09/468,601

(22) Filed: Dec. 21, 1999

(30) Foreign Application Priority Data

Jul. 2, 1999 (KR) .................................................. 99-26621

(51) Int. Cl.$^7$ ..................................................... C08F 4/602
(52) U.S. Cl. ........................... 526/65; 526/159; 526/160; 526/901; 526/346; 526/129; 526/127; 422/140
(58) Field of Search ..................... 526/159, 160, 526/127, 129, 901, 346, 65; 422/140

(56) References Cited

U.S. PATENT DOCUMENTS

| 4,544,762 | 10/1985 | Kaminsky et al. | 556/179 |
|---|---|---|---|
| 5,026,798 | 6/1991 | Canich | 526/127 |
| 5,037,907 | * 8/1991 | Imabyashi et al. | 526/88 |
| 5,254,647 | 10/1993 | Yamamoto et al. | 526/65 |
| 5,484,862 | 1/1996 | Siddall et al. | 526/88 |

FOREIGN PATENT DOCUMENTS

| 0 210 615 | 7/1996 | (EP) . |
|---|---|---|
| 61-101926 | 5/1986 | (JP) . |
| 61-101927 | 5/1986 | (JP) . |
| 62-023895 | 2/1987 | (JP) . |
| 02053711 | 3/1990 | (JP) . |
| 02127827 | 5/1990 | (JP) . |
| 03057596 | 3/1991 | (JP) . |
| 03291978 | 10/1991 | (JP) . |
| WO99/10394 | 3/1999 | (WO) . |

OTHER PUBLICATIONS

U.S. application No. 08/844,109, Kim et al., filed Apr. 28, 1997.
U.S. application No. 08/844,110, Kim et al., filed Apr. 28, 1997.

* cited by examiner

*Primary Examiner*—David W. Wu
*Assistant Examiner*—William Cheung
(74) *Attorney, Agent, or Firm*—Woodcock Washburn Kurtz Mackiewicz & Norris

(57) ABSTRACT

The present invention relates to a polymerization process for preparing syndiotactic polystyrenes, which comprises a step of microfluidizing in a microfluidization apparatus both a catalyst mixture consisting of a styrene monomer, a metallocene catalyst and an inert organic solvent and a cocatalyst mixture consisting of a styrene monomer, a cocatalyst and an inert organic solvent, and a step of reacting the microfluidized mixture with a catalyst and a cocatalyst in a reactor. The metallocene catalyst has a bridged structure of a complex of Group IV transition metals such as Ti, Zr, Hf etc. in the Periodic Table and a ligand having one or two cycloalkane dienyl groups such as cyclopentadienyl group, indenyl groups, fluorenyl group, and derivatives thereof. The reactor is a well stirred reactor equipped with agitating blades therein to mix the reactants well. In this invention, the plural number of reactors can be employed in series for more effective polymerization, and the plural number of microfluidization apparatuses can be employed in parallel.

14 Claims, 2 Drawing Sheets

POLYMERIZATION PROCESS FOR PREPARING SYNDIOTACTIC POLYSTYRENES THROUGH MICROFLUIDIZATION

FIELD OF THE INVENTION

The present invention relates to polymerization processes for preparing syndiotactic polystyrenes. More particularly, the present invention relates to polymerization processes for preparing syndiotactic polystyrenes, which comprise a step of microfluidizing in a microfluidization apparatus both a catalyst mixture consisting of a styrene monomer, a metallocene catalyst and an inert organic solvent and a cocatalyst mixture consisting of a styrene monomer, a cocatalyst and an inert organic solvent, and a step of reacting the microfluidized mixture with a catalyst and a cocatalyst in a reactor

BACKGROUND OF THE INVENTION

In general, polystrenes are classified into an atactic, an isotactic and a syndiotactic structure depending on the positioning of benzene rings as side chains. An atactic polystyrene has an irregular arrangement of the benzene rings and an isotactic polystyrene has an arrangement that the benzene rings are positioned at one side of the polymer main chain. On the other hand, an syndiotactic polystyrene has a regularly alternating arrangement of the benzene rings.

Metallocene catalysts are used for preparing the syndiotactic polystyrenes. The metallocene catalysts have a bridged structure of a complex of Group IV transition metals such as Ti, Zr, Hf etc. in the Periodic Table and a ligand having one or two cycloalkane dienyl groups such as cyclopentadienyl group, indenyl groups, fluorenyl group, and derivatives thereof. As the metallocene catalysts have high activities, the catalysts can prepare polymers having better physical properties than the Ziegler-Natta catalysts.

A metallocene catalyst is used with a cocatalyst. A representative example of the cocatalyst is alkyl aluminoxane which is prepared by reacting water with an alkyl aluminum compound. Such catalyst system can prepare polystyrene having a high syndiotactic stereoregularity and a high molecular weight.

European Patent Publication No. 210615 A2 (1987) discloses a syndiotactic polystyrene with stereoregularity which is prepared by using a catalyst of cyclopentadienyl titanium trichloride or alkylated cyclopentadienyl titanium such as pentamethyl cyclopentadienyl titanium trichloride. Such catalysts are known to have preferable catalyst activity, molecular weight, and syndiotactic index.

Japanese Patent Publication Nos. 63-191811 and 3-250007 disclose sulphur bridged metallocene catalysts which have a low yield of manufacture. Also, Japanese Patent Publication Nos. 3-258812, 4-275313 and 5-105712 disclose alkyl bridged metallocene catalysts which have too low a yield of manufacture to commercialize.

U.S. Pat. No. 4,544,762 teaches a process for polymerizing alpha-olefins or styrenes with a high activity and a high stereoregularity using a catalyst system consisting of a transition metal catalyst and a reaction product of alkyl aluminum and metal hydroxide. The catalyst system can prepare polyolefins or polystyrenes with a higher activity and a higher stereoregularity than the Ziegler-Natta catalyst.

Japanese Patent Publication Nos. 62-104818 and 62-187708 disclose metallocene catalysts for preparing polystyrene having a syndiotactic structure. The metallocene catalysts have a transition metal of Group IVB of the Periodic Table and a cyclopentadienyl derivative as ligand. With the catalysts, alkyl aluminoxan is used as cocatalyst, which is a reaction product of an alkyl aluminum with a metal hydroxide.

U.S. Pat. No. 5,026,798 teaches a catalytic process using a Group IVB transition metal component and an aluminoxane component to polymerize alpha-olefins to produce high crystallinity and high molecular weight poly-alpha-olefins.

U.S. patent Ser. No. 08/844109 U.S. Pat. No. 6,010,974 and Ser. No. 08/844,110 abandoned disclose new alkyl-bridged binuclear metallocene catalyst, silyl-bridged binuclear metallocene catalyst, and alkyl-silyl-bridged binuclear metallocene catalyst to polymerize styrenes to produce polystyrene having high stereoregularity, high melting point, and good molecular weight distribution.

A batch process or a continuation process is adopted to prepare polystyrene having a syndiotactic structure. The processes employ a tank-type reactor equipped with agitating blades.

U.S. Pat. No. 5,037,907 discloses a vertical tank-type reactor with a agitating blade. The process is called as solution polymerization because the monomers remain in a liquid phase during polymerization. In theoretical, although this process can prevent the polymer from agglomerating because the liquid media are dispersed on the surface of the polymer particles, this type reactor still causes a problem of a low monomer conversion rate such as 75% below which will result in deteriorating quality of the polymer.

U.S. Pat. No. 5,254,647 discloses a self-cleaning reactor which is capable of continuation process and is a twin screw reactive extruder type. The reactor can prevent agglomeration of polymer through mixing. The wiped surface reactor controls polymerization until about 10 to 20% of the polymer product is obtained in a powder state, and a continuation process is carried out in a powder bed reactor which is a vertical tank type. This reactor can prevent a rapid polymerization. However, it is not economical due to use of two reactors and it has a disadvantage for the wiped surface reactor to limit the process capacity of the system.

U.S. Pat. No. 5,484,862 discloses a liquid phase, powder bed polymerization process for preparing syndiotactic polymers of vinyl aromatic monomers comprising continuously introducing one or more vinyl aromatic monomers and one or more catalyst systems to a horizontally disposed, continuously agitated, cylindrically shaped reactor containing a particulated solid, and continuously removing polymerized product therefrom.

PCT Publication No. 99/10394 discloses a process to produce syndiotactic polymer, which comprises preparing a polymer-containing mixture by polymerizing a first aromatic vinyl monomer with a catalyst at the conversion rate of from 60 to 80% in a first reverse mixing reactor under polymerization condition, and introducing the polymer-containing mixture to a second or more reverse mixing reactors to contact a second aromatic vinyl monomer under polymerization condition.

However, when the conversion rate to polymer is 10% or more, the conventional processes produce large particles having a diameter of 2 mm or more to result in difficult transportation and low drying efficiency. Further, the conventional processes have a shortcoming to form agglomeration of the polymer on the inner surface of the reactor and agitator. The agglomerated material cannot easily be removed because of strong adhesion and causes bad agitation during repolymerization without removing.

Accordingly, the present inventors have developed a process to polymerize styrenes to produce polystyrene having high stereoregularity, high melting point, and good molecular weight distribution, which comprises microfluidizing styrene monomers and catalysts at high pressure to control precisely the polymer particle size to 100 μm or less and not to agglomerate on the inner surface of the reactor.

OBJECTS OF THE INVENTION

An object of the present invention is to provide a process of preparing syndiotactic polystyrene having a precise particle size which is advantageous for transportation and drying process.

Another object of the present invention is to provide a process of preparing syndiotactic polystyrene, which does not form agglomeration of the polymer particles on the inner surface of the reactor.

A further object of the present invention is to provide a process of preparing syndiotactic polystyrene having high activity, high stereoregularity and good molecular weight distribution, which can uniformly disperse the styrene monomers and catalysts through microfluidization.

The above and other objects and advantages of this invention will be apparent from the ensuing disclosure and appended claims.

SUMMARY OF THE INVENTION

The present invention relates to a polymerization process for preparing syndiotactic polystyrenes, which comprises a step of microfluidizing in a microfluidization apparatus both a catalyst mixture consisting of a styrene monomer, a metallocene catalyst and an inert organic solvent and a cocatalyst mixture consisting of a styrene monomer, a cocatalyst and an inert organic solvent, and a step of reacting the microfluidized mixture with a catalyst and a cocatalyst in a reactor. The metallocene catalyst has a bridged structure of a complex of Group IV transition metals such as Ti, Zr, Hf etc. in the Periodic Table and a ligand having one or two cycloalkane dienyl groups such as cyclopentadienyl group, indenyl groups, fluorenyl group, and derivatives thereof. The reactor is a well stirred reactor equipped with agitating blades therein to mix the reactants well. In this invention, the plural number of reactors can be employed in series for more effective polymerization, and the plural number of microfluidization apparatuses can be employed in parallel.

DETAILED DESCRIPTION OF THE INVENTION

Figure 1:
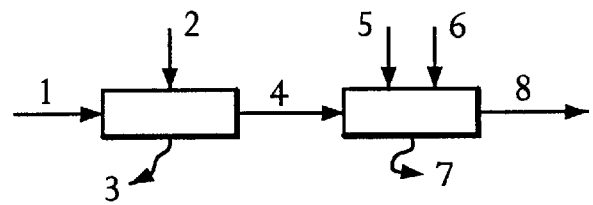
FIG. 1 is a diagram of a system for preparing polystyrene using a microfluidization apparatus and a reactor in accordance with the present invention.

The syndiotactic polystyrene according to the present invention is prepared by microfluidizing in a microfluidization apparatus both a catalyst mixture and a cocatalyst mixture, and reacting the microfluidized mixture with a catalyst and a cocatalyst in a reactor. The catalyst mixture consists of a styrene monomer, a metallocene catalyst and an inert organic solvent, and the cocatalyst mixture consists of a styrene monomer, a cocatalyst and an inert organic solvent.

The styrene monomer used in this invention is represented in the following general formula (A) or (B):

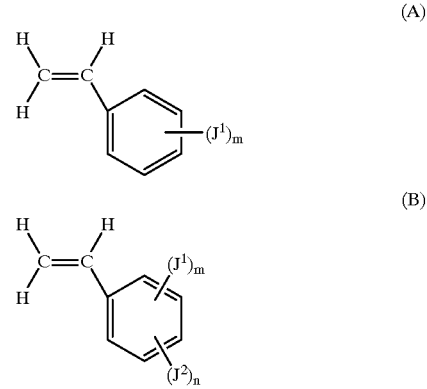

In the general formula (A), $J^1$ is a hydrogen, a halogen, a substitued group containing at least one of carbon, oxygen, silicon, phosphor, sulfur, selenium, and tin, m is 1, 2 or 3. If m is 2 or 3, $J^1$s may be different each other.

In the general formula (B), $J^1$ is a hydrogen, a halogen, a substitued group containing at least one of carbon, oxygen, silicon, phosphor, sulfur, selenium, and tin, $J^2$ is a substituted group of $C_{2-10}$ having at least one unsaturated bond, m is 1, 2 or 3, n is 1 or 2. If m is 2 or 3 and n is 2, $J^1$s and $J^2$s may be different each other.

The representative examples of the general formula (A) are alkylstyrene, halogenated styrene, halogen-substituted alkylstyrene, alkoxystyrene, vinylbiphenyl, vinylphenylnaphthalene, vinylphenylanthracene, vinylphenylpyrene, trialkylsilylvinylbiphenyl, alkylsilylstyrene, carboxymethylstyrene, alkylesterstyrene, vinylbenzenesulphonic acid ester, and vinylbenzyldialkoxyphosphide.

The representative examples of alkylstyrene are styrene, methylstyrene, ethylstyrene, butylstyrene, p-methylstyrene, p-tert-butylstyrene, and dimethylstyrene; those of halogenated styrene are chlorostyrene, bromostyrene, and fluorostyrene; those of halogen-substituted alkylstyrene are chloromethylstyrene, bromomethylstyrene, and fluoromethylstyrene; those of alkoxystyrene are methoxystyrene, ethoxystyrene, and butoxystyrene; those of vinylbiphenyl are 4-vinylbiphenyl, 3-vinylbiphenyl, and 2-vinylbiphenyl; those of vinylphenylnaphthalene are 1-(4-vinylbiphenylnaphthalene), 2-(4-vinylbiphenylnaphthalene), 1-(3-vinylbiphenylnaphthalene), 2-(3-vinylbiphenylnaphthalene), and 1-(2-vinylbiphenylnaphthalene ); those of vinylphenylanthracene are 1-(4-vinylphenyl)anthracene, 2-(4-vinylphenyl)anthracene, 9-(4-vinylphenyl)anthracene, 1-(3-vinylphenyl) anthracene, 9-(3-vinylphenyl)anthracene, and 1-(4-vinylphenyl)anthracene; those of vinylphenylpyrene are 1-(4-vinylphenyl)pyrene, 2-(4-vinylphenyl)pyrene, 1-(3-vinylphenyl)pyrene, 2-(3-vinylphenyl)pyrene, 1-(2-vinylphenyl)pyrene, and 2-(2-vinylphenyl)pyrene; that of trialkylsilylvinylbiphenyl is 4-vinyl-4-trimethylsilylbiphenyl; and those of alkylsilylstyrene are p-trimethylsilylstyrene, m-trimethylsilylstyrene, o-trimethylsilylstyrene, p-triethylsilylstyrene, m-triethylsilylstyrene, and o-triethylsilylstyrene.

The representative examples of the general formula (B) are divinylbenzene such as p-divinylbenzene and m-divinylbenzene, trivinylbenzene, and arylstyrene such as p-arylstyrene and m-arylstyrene.

Conventional catalysts for preparing polystyrene having high syndiotacticity can be employed in the present invention, but are not limited particularly. In general, metallocene catalysts consisting of a transition metal compound of Group IV of the Periodic Table can be used. Preferably, a metallocene catalyst consisting of a titanium compound can be used. Suitable catalysts employed in the present process include an alkyl bridged bimetallocene (ABBM), a silyl bridged bimetallocene (SBBM), and an alkyl-silyl bridged bimetallocene (A-SBBM). The catalysts are disclosed in U.S. Ser. Nos. 08/844,109 and 08/844,110 in detail.

In the present invention, the metallocene catalyst is used with a cocatalyst. The cocatlayst is an organometallic compound such as alkylaluminoxane and alkylaluminum compound, which are known to an ordinary person in the art. The representative examples of alkylaluminoxane are methylaluminumoxane (MAO) and modified methylaluminiumoxane (MMAO). The alkylaluminoxane includes an alkylaluminoxane having a repeating unit of the following formula (C), a linear alkylaluminoxane represented by the following formula (D), and a cyclic alkylaluminoxane represented by the following formula (E):

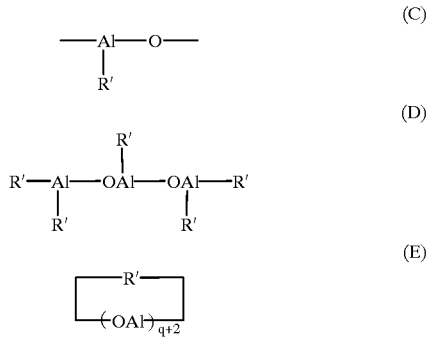

wherein $R^1$ is an alkyl group of $C_{1-6}$ and q is an integer of 0~100.

The examples of alkylaluminum compound usable as a cocatalyst in this invention are trimethyl aluminium, triethyl aluminium, dimethyl aluminium chloride, diethyl aluminium chloride, triisobutyl aluminium, diisobutylaluminium chloride, tri(n-butyl)aluminium, tri(n-propyl) aluminium and triisopropyl aluminium. Triisobutyl aluminum can be preferably used.

The molar ratio of aluminum of alkylaluminoxane to transition metal of Group IV of metallocene catalyst is in 1:1 to 1000:1, preferably 10:1 to 500:1.

The molar ratio of alkylaluminum to transition metal of Group IV of metallocene catalyst is in 1:1 to 10000:1, preferably 10:1 to 5000:1, more preferably 10:1 to 1000:1.

The syndiotactic polystyrene according to the present invention is prepared by microfluidizing in a microfluidization apparatus both a catalyst mixture and a cocatalyst mixture, and reacting the microfluidized mixture with a catalyst and a cocatalyst in a reactor. The catalyst mixture consists of a styrene monomer, a metallocene catalyst and an inert organic solvent, and the cocatalyst mixture consists of a styrene monomer, a cocatalyst and an inert organic solvent. As the inert organic solvent, hexane, heptane, kerosine, decane, benzene, toluene, xylene, and chlorobenzene are preferably used, and aromatic solvents such as benzene, toluene, xylene etc are more preferably used.

M-100 series laboratory microfluidizer (Microfluidics Corporation) is used to microfluidize both a catalyst mixture and a cocatalyst mixture. The microfluidizer is available on the market, and the present invention is not limited by the structure of the microfluidizer.

FIG. 1 is a diagram of a system for preparing polystyrene using a microfluidization apparatus 3 and a reactor 7 in accordance with the present invention. The catalyst mixture 1 and cocatalyst mixture 2 are microfluidized in the microfluidization apparatus 3, and the microfluidized flow 4 is fed to the reactor 7 to react with a metallocene catalyst 5 and an alkylaluminum cocatalyst 6. Polystyrene is prepared in the conversion rate of 50~80%.

Figure 2:
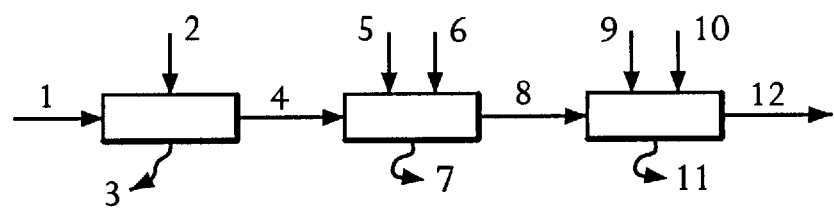
FIG. 2 is a diagram of a system for preparing polystyrene using a microfluidization apparatus and two reactors in series.

FIG. 2 is a diagram of a system for preparing polystyrene using a microfluidization apparatus and two reactors in series. The catalyst mixture 1 and cocatalyst mixture 2 are microfluidized in the microfluidization apparatus 3, and the microfluidized flow 4 is fed to the reactor 7 to react with a metallocene catalyst 5 and an alkylaluminum cocatalyst 6 so as to prepare polystyrene in the conversion rate of 10~40%. The polystyrene and the unreacted mixture are fed to the reactor 11 to react with a metallocene catalyst 9 and an alkylaluminum cocatalyst 10 so as to prepare polystyrene in the conversion rate of 50~80%.

Figure 3:
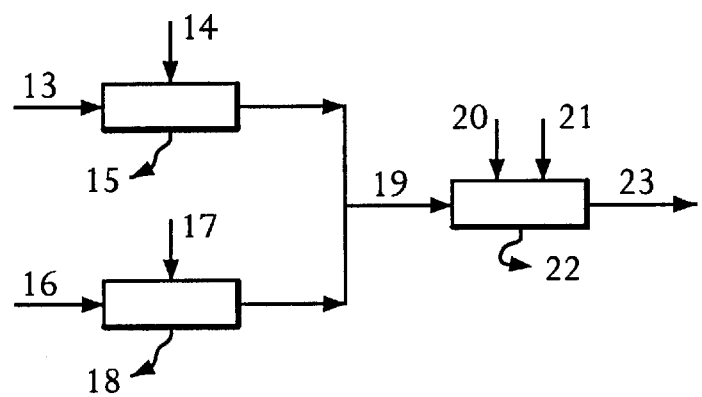
FIG. 3 is a diagram of a system for preparing polystyrene using two microfluidization apparatuses in parallel and a reactor.

FIG. 3 is a diagram of a system for preparing polystyrene using two microfluidization apparatuses in parallel and a reactor. The catalyst mixture 13 and 16 and cocatalyst mixture 14 and 17 are microfluidized in the microfluidization apparatuses 15 and 18, and the microfluidized flow 19 is fed to the reactor 22 to react with a metallocene catalyst 20 and an alkylaluminum cocatalyst 21. Polystyrene is prepared in the conversion rate of 50~80%.

When the catalyst mixture and cocatalyst mixture are microfluidized in a microfluidization apparatus, the pressure therein is preferably from 14.7 psig to 20,000 psig, more preferably from 14.7 psig to 10,000 psig.

In the present invention, a well stirred reactor may be preferably employed, which is designed to mix well the reactants with agitation blades equipped therein, but the plug-flow reactor is not suitable. The reactors are disclosed in "Chemical Engineer's Handbook(5th edition), p4~22, McGraw-Hill (1973)" by Perry & Chilton. The polymerization of styrene monomer in the reactor is preferably conducted at the temperature of 0~140° C., and more preferably 30~100° C.

The present invention will be described in more detail by the following Examples. The Examples are given only to illustrate the present invention and not intended in any way to limit the scope of the invention.

EXAMPLES

Example

A reactor of 1 liter volume autoclave type and M-100Y microfluidizer (Microfluidics Corporation) to microfluidize both a catalyst mixture and a cocatalyst mixture were maintained at 70° C. The catalyst mixture was prepared by adding 100 cc of purified styrene monomer and 15 $\mu$mol (Ti) of the metallocene catalyst to 100 cc of dried toluene. The metallocene catalyst is composed of Cp*Ti[OC$_6$H$_4$C(CH$_3$)$_2$C$_6$H$_4$O]$_3$TiCp* disclosed on U.S. patent Ser. No. 08/844,109 U.S. Pat. No. 6,010,974 and Ser.

No. 08/844,110 abandoned. The cocatalyst mixture was prepared by adding 100 cc of purified styrene monomer, 36 mmol (Al) of triisobutyl aluminium, and 1.5 mmol (Al) of modified methylaluminoxane to 100 cc of dried toluene.

To M-100Y microfluidizer the catalyst mixture and the cocatalyst mixture were added, then microfluidized at the pressure of 7000 psig. The fluidized mixture was added in the autoclave type reactor maintained at 70° C. The fluidized mixture was agitated at 400 rpm. After 30 minutes, 30 µmol (Ti) of the metallocene catalyst and 3.0 mmol (Al) of modified methylaluminoxane were added to the solution consecutively for 30 minutes. The resulting solution was agitated for 1 hour.

The prepared polystyrene was not adhered to the inner wall of the reactor. Then the polymerization was stopped by adding methanol. The prepared polymer was washed with methanol containing HCl and filtered. The physical properties of the obtained polystyrene are showed in Table 1.

Figure 4:
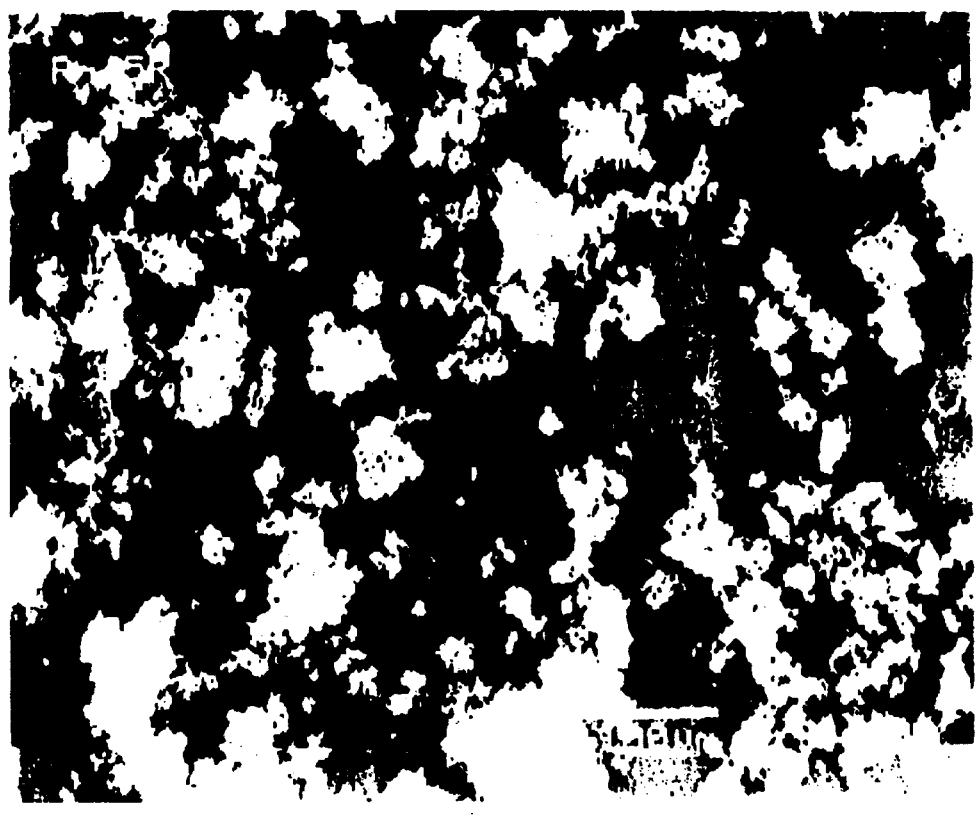
FIG. 4 is a SEM photograph showing the configuration of a polystyrene which is prepared in accordance with the present invention.

FIG. 4 shows a SEM photograph showing the configuration of a polystyrene prepared according to the example. The polystyrene is composed of particles having an average diameter smaller than 100 µm.

Comparative Example

This Comparative Example was conducted in the same manner as in the Example except that microfluidizer was not used for polymerization. To the reactor of 1 liter volume autoclave type, nitrogen was added consecutively to eliminate contaminant like moisture over two hours. And the reactor was maintained at 70° C. To the autoclave-type reactor 200 cc of purified styrene monomer was added and agitated at 400 rpm. 36 mmol (Al) of triisobutyl aluminium was added to the solution. After 10 minutes, 4.5 mmol (Al) of modified methylaluminoxane and 45 µmol (Ti) of metallocene catalyst were added consecutively for 30 minutes and agitated for 1 hour.

The prepared polystyrene was washed, filtered and dried in the same manner as in Example. The physical properties of the obtained polystyrene are showed in Table 1. Many of the prepared polystyrene was larger than 2 mm in the diameter size, and the yield of polystyrene adhered on the inner wall of the reactor was 20 wt %.

TABLE 1

|  | Example | Comparative Example |
| --- | --- | --- |
| catalyst concentration (µmol) |  |  |
| microfluidizer | 15 | 0 |
| autoclave | 30 | 45 |
| conversion rate (%) | 62.5 | 60.2 |
| molecular weight (Mw) | 547,200 | 407,200 |
| (MWD) | 2.23 | 2.37 |
| particle size | <100 µm | >2 mm |
| configuration | FIG. 4 | — |

In the above, the present invention was described based on the preferred embodiment of the present invention, but it should be apparent to those ordinarily skilled in the art that various changes and modifications can be added without departing from the spirit and scope of the present invention. Such changes modifications should come within the scope of the present invention.

What is claimed is:

1. A polymerization process for preparing a syndiotactic polystyrene, which comprises:

microfluidizing in a microfluidization apparatus both a catalyst mixture consisting of a styrene monomer, a metallocene catalyst and an inert organic solvent, and a cocatalyst mixture consisting of a styrene monomer, a cocatalyst and an inert organic solvent; and reacting the microfluidized mixture with a catalyst and a cocatalyst in a reactor.

2. The polymerization process of claim 1 in which said styrene monomer is selected from the group consisting of alkylstyrene, halogenated styrene, halogen-substituted alkylstyrene, alkoxystyrene, vinylbiphenyl, vinylphenylnaphthalene, vinylphenylanthracene, vinylphenylpyrene, trialkylsilylvinylbiphenyl, alkylsilylstyrene, carboxymethylstyrene, alkylesterstyrene, vinylbenzenesulphonic acid ester, vinylbenzyldialkoxyphosphide, divinylbenzene, trivinylbenzene, arylstyrene and a mixture thereof.

3. The polymerization process of claim 1 in which said metallocene catalyst is a transition metal compound of Group IV of the Periodic Table selected from the group consisting of an alkyl bridged bimetallocene (ABBM), a silyl bridged bimetallocene (SBBM), and an alkyl-silyl bridged bimetallocene (A-SBBM).

4. The polymerization process of claim 1 in which said cocatalyst is an alkylaluminoxane or an alkylaluminum compound.

5. The polymerization process of claim 4 in which said alkylaluminoxane is methylaluminumoxane (MAO) or modified methylaluminiumoxane (MMAO).

6. The polymerization process of claim 4 in which said alkylaluminoxane is an alkylaluminoxane having a repeating unit of the following formula (C), a linear alkylaluminoxane represented by the following formula (D), or a cyclic alkylaluminoxane represented by the following formula (E):

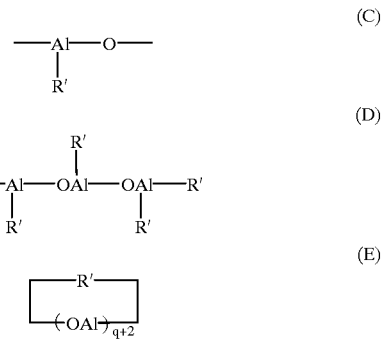

wherein $R^1$ is an alkyl group of $C_{1-6}$ and q is an integer of 0~100.

7. The polymerization process of claim 6 in which the molar ratio of aluminum of said alkylaluminoxane to transition metal of Group IV of said metallocene catalyst is in 10:1 to 500:1.

8. The polymerization process of claim 4 in which said alkylaluminum compound is selected from the group consisting of trimethyl aluminium, triethyl aluminium, dimethyl aluminium chloride, diethyl aluminium chloride, triisobutyl aluminium, diisobutylaluminium chloride, tri(n-butyl) aluminium, tri(n-propyl)aluminium and triisopropyl aluminium.

9. The polymerization process of claim 8 in which the molar ratio of said alkylaluminum to transition metal of Group IV of said metallocene catalyst is in 10:1 to 1000:1.

10. The polymerization process of claim 1 in which said inert organic solvent is selected from the group consisting of hexane, heptane, kerosine, decane, benzene, toluene, xylene, and chlorobenzene.

11. The polymerization process of claim 1 in which said process in the reactor is conducted at the temperature of 30~100° C.

12. The polymerization process of claim 1 in which said catalyst mixture and cocatalyst mixture are microfluidized in a microfluidization apparatus at about 10,000 psig.

13. A polymerization process for preparing a syndiotactic polystyrene, which comprises:
   microfluidizing in a microfluidization apparatus both a catalyst mixture consisting of a styrene monomer, a metallocene catalyst and an inert organic solvent, and a cocatalyst mixture consisting of a styrene monomer, a cocatalyst and an inert organic solvent;
   reacting the microfluidized flow in a first reactor with a metallocene catalyst and an alkylaluminum cocatalyst to prepare polystyrene in the conversion rate of 10~40%; and
   reacting the polystyrene and the unreacted mixture of the first reactor in a second reactor with a metallocene catalyst and an alkylaluminum cocatalyst to prepare polystyrene in the conversion rate of 50~80%.

14. A polymerization process for preparing a syndiotactic polystyrene, which comprises:
   microfluidizing in plural microfluidization apparatuses in parallel both a catalyst mixture consisting of a styrene monomer, a metallocene catalyst and an inert organic solvent, and a cocatalyst mixture consisting of a styrene monomer, a cocatalyst and an inert organic solvent; and
   reacting the microfluidized mixture with a catalyst and a cocatalyst in a reactor to prepare polystyrene in the conversion rate of 50~80%.

* * * * *